(12) United States Patent
Lopez-Chaves

(10) Patent No.: US 9,400,073 B2
(45) Date of Patent: Jul. 26, 2016

(54) PIPE SEAL

(71) Applicant: Trelleborg Pipe Seals Lelystad BV, Lelystad (NL)

(72) Inventor: Bernal Lopez-Chaves, Lelystad (NL)

(73) Assignee: TRELLEBORG PIPE SEALS, Lelystad, BV (NL)

( * ) Notice: Subject to any disclaimer, the term of this patent is extended or adjusted under 35 U.S.C. 154(b) by 0 days.

(21) Appl. No.: 14/401,355

(22) PCT Filed: May 14, 2013

(86) PCT No.: PCT/EP2013/059957
§ 371 (c)(1),
(2) Date: Nov. 14, 2014

(87) PCT Pub. No.: WO2013/171223
PCT Pub. Date: Nov. 21, 2013

(65) Prior Publication Data
US 2015/0152990 A1    Jun. 4, 2015

(30) Foreign Application Priority Data

May 14, 2012 (EP) .................................... 12167952

(51) Int. Cl.
| F16L 17/00 | (2006.01) |
| F16L 37/084 | (2006.01) |
| F16L 21/03 | (2006.01) |
| F16L 21/08 | (2006.01) |
| F16L 37/092 | (2006.01) |
| F16L 47/08 | (2006.01) |
| F16L 47/12 | (2006.01) |
| F16J 15/10 | (2006.01) |

(52) U.S. Cl.
CPC ........... *F16L 37/0845* (2013.01); *F16J 15/104* (2013.01); *F16L 21/03* (2013.01); *F16L 21/08* (2013.01); *F16L 37/0925* (2013.01); *F16L 47/08* (2013.01); *F16L 47/12* (2013.01)

(58) Field of Classification Search
CPC ................................ F16L 17/035; F16L 21/04
See application file for complete search history.

(56) References Cited

U.S. PATENT DOCUMENTS 4,572,523 A * 2/1986 Guettouche et al. .......... 277/616
5,324,083 A * 6/1994 Vogelsang .................... 285/110
(Continued)

FOREIGN PATENT DOCUMENTS

DE    2628727 A1    1/1978
DE    3405988 A1    8/1985
(Continued)

*Primary Examiner* — Gilbert Lee
(74) *Attorney, Agent, or Firm* — Knobbe Martens Olson & Bear LLP

(57) ABSTRACT

The invention relates to pipe seals (10) for sealing a joint between a first pipe (32) a second pipe (42), said pipe seal (10) comprising a carrier member (12) and a sealing member (14) attached to the carrier member (12). The carrier member (12) comprises at least one retaining insert (24) with an inner grip portion (52) for gripping the second pipe (42), wherein the retaining insert (24) comprises an outer grip portion (54) for gripping the first pipe (32).

12 Claims, 2 Drawing Sheets

(56) References Cited

U.S. PATENT DOCUMENTS

| | | | |
|---|---|---|---|
| 7,093,863 B2* | 8/2006 | Holmes, IV | F16L 21/08 285/104 |
| 2005/0218652 A1* | 10/2005 | Sakamoto | 285/343 |
| 2005/0275217 A1 | 12/2005 | Walworth et al. | |
| 2008/0157522 A1* | 7/2008 | Freudendahl | 285/337 |
| 2008/0303223 A1* | 12/2008 | Nijsen | 277/620 |
| 2008/0315575 A1* | 12/2008 | Vitel et al. | 285/80 |
| 2009/0060635 A1 | 3/2009 | Jones | |
| 2010/0090460 A1* | 4/2010 | Vitel et al. | 285/306 |
| 2013/0076027 A1* | 3/2013 | Maenishi et al. | 285/338 |

FOREIGN PATENT DOCUMENTS

| | | | |
|---|---|---|---|
| EP | 1236002 | 9/2002 | |
| EP | 1881251 A2 | 1/2008 | |
| FR | 2907877 | 9/1995 | |
| FR | 2939177 A1 * | 6/2010 | F16L 21/03 |
| WO | WO82/03440 | 10/1982 | |

* cited by examiner

PIPE SEAL

CROSS-REFERENCE TO RELATED APPLICATIONS

This application is the U.S. National Phase under 35 U.S.C. §371 of International Application PCT/EP2013/059957, filed May 14, 2013, which claims priority to EP 12167952.6, filed May 14, 2012. The disclosures of the above-described applications are hereby incorporated by reference in their entireties.

FIELD OF THE INVENTION

The invention relates to pipe seals for sealing a bell-and-spigot joint between a first pipe and a second pipe, said pipe seals comprising a carrier member and a sealing member attached to the carrier member, wherein the carrier member comprises at least one retaining insert with an inner grip portion for gripping the second pipe.

BACKGROUND OF THE INVENTION

Such seals are for example known from EP 1 236 002 B1.

Pipe seals of the above-mentioned type are used to seal pipes, in particular plastic pipes that are used in large pipe systems. Large pipe systems are usually built from a plurality of pipes that are affixed to each other. The pipes have one end at which their diameter is slightly enlarged to form a socket or bell so that they partially fit into each other, forming a kind of pipeline. The pipe seals seal off the space between the pipes and thus securely close in the medium that is transported by the pipe system. In particular, the pipes may be connected by means of bell-and-spigot joints or by loose couplers.

Pipe systems that are built this way are widely used for distributing and transmitting media such as potable water. In these systems, there are two factors that have to be observed in order to successfully hold the pipes together and keep the pipe system leak-proof.

Firstly, there is a constant pressure in the transported liquid which the pipe system needs to withstand. Secondly, there is thrust, which is a more dynamic component.

Hydrostatic and hydrodynamic forces that are unbalanced within a pipeline are referred to as thrust forces. Hydrodynamic thrust forces are mostly insignificant in public potable water systems due to the characteristic range of pressures and media velocities of municipal pressure pipe systems. In municipal applications such as water transmission and distribution as well as sewer force mains, thrusts occur whenever there is a change in the direction of flow, as is the case when fittings or other appendages are adjoined to a pipe. Thrusts also appear whenever there are changes in the cross-sectional area of the pipeline such as at reducers and during the opening and closing of valves and hydrants.

Thrust can cause separation of the pipe joints, in particular in bell-and-spigot push-on joints, if it is not counterbalanced with an equal and opposite reaction force. Common remedies for this problem include thrust blocks or lug-type mechanical joint restraint devices. These two approaches can also be combined and used together. Both thrust blocks and traditional joint restraints are arranged externally to a pipe system.

US 2009/0060635 A1 relates to a pipe seal having a sealing member and a carrier member. The carrier member is provided with a recess which is formed inside the carrier member for receiving a gripping ring. The gripping ring has about the same outer diameter as an inner surface of the recess formed inside the carrier member. Thus, the gripping ring is provided with a gap and is deformable to close the gap. This temporarily reduces the diameter of the gripping ring so that it can be set into the recess.

In EP 1 881 251 A2, retaining inserts are rigidly fixated in a support ring of a sealing element.

SUMMARY OF THE INVENTION

The present invention aims to solve the problem of improving connection security of pipe seals of the above-mentioned kind.

As a solution it is proposed that the carrier member of the pipe seal as mentioned above comprises an outer grip portion for gripping the first pipe.

Such a grip portion increases friction between the sealing ring and the first pipe. The retaining insert effectively grips the surfaces of both the first and the second pipe and hold the pipes together against thrust forces. Furthermore, the sealing ring is kept from escaping the groove of the first pipe. External devices such as thrust blocks or external joint restraints are no longer necessary. The section in which the pipes are connected thus becomes smaller, as no external devices need additional space.

The retaining insert can be rotatably or pivotally mounted on the carrier member. The ability to pivot the retaining insert with respect to the carrier member enables moving the retaining inserts to compensate for slight variations in pipe diameter and shape. Pivoting the retaining insert also allows the grip portions to be ideally oriented and aligned for maximum effect. Furthermore, this ability can allow for the inserts to be moved out of the way if required, e.g. for inserting the second pipe.

The retaining insert may comprise a curved surface which matches a curved surface of the carrier member to allow a guided pivoting movement of the retaining insert. Such a movement guide via two matching surfaces can be easily provided at a low cost.

The inner grip portion may comprise inward serration means for retaining the second pipe. The outer grip portion may comprise outward serration means for retaining the first pipe. Serration means or jags allow the grip portion to locally apply high pressure to the surface of the pipes. The surface of the pipes is deformed by the pressure and wraps itself around the serration means, improving the transmission of forces from the pipes to the corresponding grip portion. The serration means or jags may also pierce the surface of the pipes and hook into the surface. This way, the resistance to thrust forces is increased.

The carrier member may comprise a plurality of retaining inserts. This allows for more evenly balancing the retaining stress on the surfaces of the pipes. Also, instead of providing one large retaining insert, a multitude of smaller retaining inserts can more effectively grip the pipes and in total require less material than a single retaining insert.

The retaining inserts may be spaced evenly. This is particularly advantageous in pipes with an annular cross-section. In this way, the thrust forces are distributed evenly and local tension spikes in the material of the pipes are reduced.

The retaining insert may comprise an attachment portion for attachment to the carrier member. Allowing the retaining insert to be attached to the carrier member reduces the risk of the retaining insert falling out or not being inserted into the carrier the right way. Providing these two portions thus makes the pipe seal easier to handle.

The carrier member may comprise an opening in which the retaining insert is inserted. The opening may be slightly smaller than the attachment portion of the retaining insert in at least one dimension so that the retaining insert may be friction-locked in the opening. The retaining insert may be fastened much more effectively to the carrier member this way. It is not necessary to provide any supporting fixation means for the retaining inserts.

In an advantageous embodiment, the opening is dimensioned to allow pivoting or rotation of the retaining insert, providing the advantages mentioned above. During transport and handling of the pipe seal, damage or injury caused by the retaining insert can be reduced if the retaining insert can be at least partially pivoted or pushed into a storage position inside the carrier member.

The hardness of the retaining insert may be higher than that of the first pipe and/or that of the second pipe. This makes it easier for the retaining insert to securely grip the surface of the pipes. The surfaces of the pipes are deformed by the serration means to contact the retaining insert more closely which provides better transmission of forces between the retaining insert and the surfaces of the pipes. In particular, the retaining insert may be made of metal which is particularly advantageous if used in conjunction with pipes made of plastic, e.g. PVC.

The carrier member may be resiliently deformable. Upon insertion into the groove, the pipe seal may be slightly deformed, e.g. folded, to be smaller than its diameter in relaxed state. The pipe seal may then be introduced into an end of the first pipe that contains the groove. That way, the pipe seal may be transported separately from the pipes. Just as well, different pipe seals adapted to the particular task for which the pipes are to be used may be utilized when the pipes are connected.

The carrier member may be formed to conform to a surface of the groove such as to maximize the size of a contact portion between the carrier member and the groove. This way, forces such as thrust forces that are introduced into the carrier member may be distributed and supported over a larger surface of the groove that is in contact with the carrier. This distribution is more even and reduces the risk of damaging the groove and the first pipe by overstress.

Pipe seals according to the present invention may be used in particular in conjunction with bell-and-spigot joints, which are also known as spigot-and-socket joints, or with fittings or couplers that are used to interconnect pipes.

The invention will now be described by way of example with reference to the accompanying schematic drawings.

DETAILED DESCRIPTION

Figure 1:
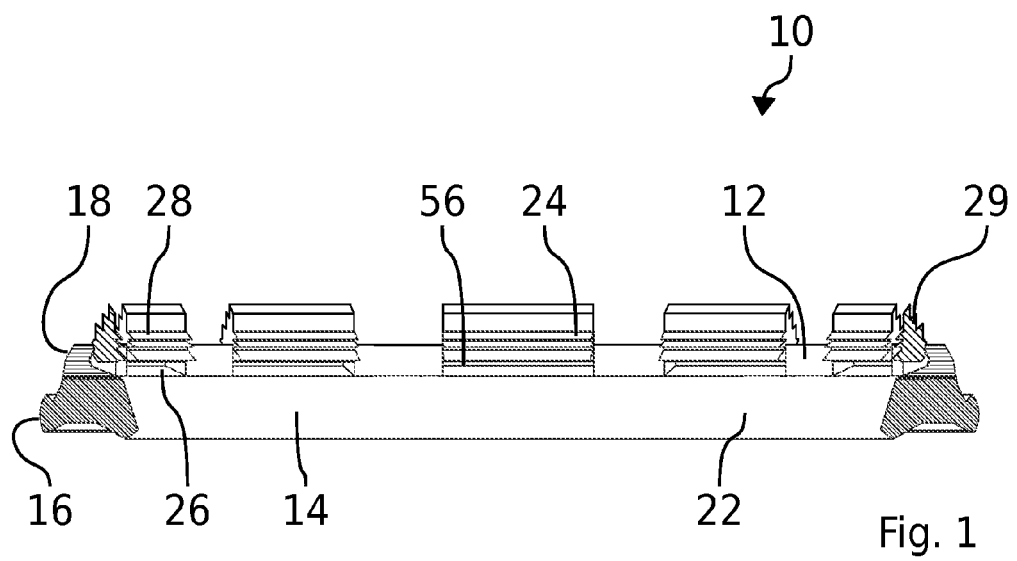
FIG. 1 shows a cross-sectional view of a pipe seal according to a first embodiment of the present invention.
Figure 2:
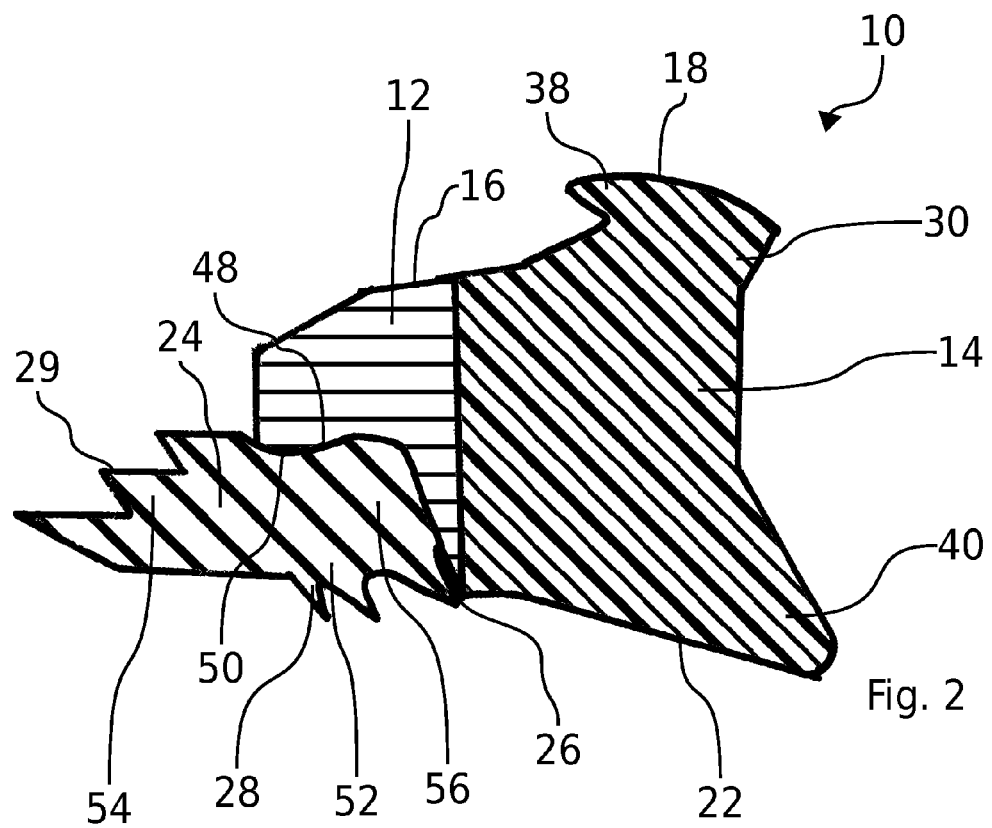
FIG. 2 shows a cross-section of the pipe seal through one of the retaining inserts.
Figure 3:
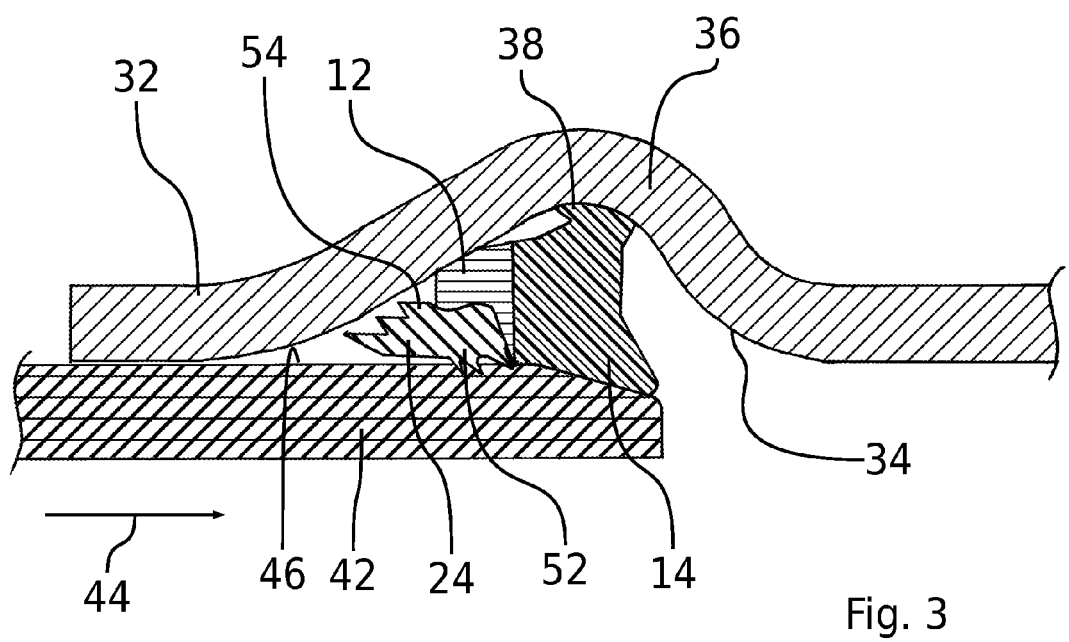
FIG. 3 shows a cross-section as in FIG. 2 when the pipe seal is arranged in a groove of a first pipe.

In FIGS. 1 to 3, an embodiment of a pipe seal 10 is shown. The pipe seal 10 is generally inserted into a bell end of a first pipe 32 having a groove 36 as shown in FIG. 3.

The pipe seal 10 as shown in FIG. 1 comprises a carrier member 12 to which a sealing member 14 is securely attached, e.g. by welding or coextrusion. The carrier member 12 and the sealing member 14 comprise exterior surfaces 16, 18 for contacting a surface of the groove 36 of the first pipe 32. The carrier member 12 and the sealing member 14 are of annular shape. The sealing member 14 comprises an interior surface 22 for contacting an outer surface 46 of a second pipe 42, which may be inserted into the first pipe 32 along a direction of insertion 44 (FIG. 3).

The carrier member 12 is made from resiliently deformable plastic to allow the carrier member 12 to be temporarily deformed, e.g. folded, to ease insertion of the pipe seal 10 into the groove 36 of the first pipe 32. The sealing member 14 is made of sealing rubber and firmly affixed to the carrier member 12. As the sealing rubber of the sealing member 14 is comparatively soft, the plastic used for the carrier member 12 is sufficiently strong to stabilize the pipe seal 10.

The carrier member 12 comprises several retaining inserts 24 that are arranged in openings 26, as can be seen in FIG. 1, in the carrier member 12. The retaining inserts 24 are distributed along the circumference of the carrier member 12 and face inwards towards a centre of the carrier member 12. The openings 26 comprise portions that are slightly smaller than attachment portions 56 of the retaining inserts 24, so that the retaining inserts 24 are forced into the openings 26 upon insertion and are held in the openings 26 by clamping. The retaining inserts 24 are manually removable prior to installation or transportation if needed.

As shown in FIGS. 1 and 2, the retaining inserts 24 are set into the openings 26 and each comprise an inward grip portion 52 carrying inward serration means in the form of a set of inward teeth 28. The retaining inserts 24 further comprise an outward grip portion 54 carrying outward serration means in the form of outward teeth 29. The retaining inserts 24 and the teeth 28, 29 are formed as cutouts of a rotationally symmetric annular body. The teeth 28, 29 have the form of protrusions emerging from the retaining inserts 24 in a generally radial direction. Each of the retaining inserts 24 comprises three inward and outward teeth 28, 29 that are arranged in parallel to each other. The teeth 28, 29 have differing sizes and are slightly inclined.

The inward teeth 28 point radially inwards from the retaining insert 24 while the outward teeth 29 point radially outwards from the retaining insert 24. While the inward teeth 28 are inclined in the direction of insertion 44, the outward teeth 29 are inclined against the direction of insertion 44. Thus, the teeth 28, 29 point roughly in opposite directions to effectively transmit forces between the pipes 32, 42.

The sealing member 14 comprises a first leg portion 30, as shown in FIG. 2. The first leg portion 30 is provided to be pressed against a surface of a first pipe 32, in particular a surface 34 of a groove 36 in the first pipe 32. As an inner diameter of the groove 36 is generally smaller than the outer diameter of the annular sealing member 14, the first leg portion 30 is radially compressed. When the first leg portion 30 is pressed against the surface 34, it closely fits the shape of the surface 34. Thus, a sealing is established between the sealing member 14 and the surface 34.

Protruding from the first leg portion 30 is a ridge 38 which may be stressed in the direction of the carrier member 12 upon contact with the surface 34 to provide pressure to keep the sealing tightly coupled to the surface 34. The sealing member 14 further comprises a second leg portion 40 for making contact with a second pipe 42.

The first pipe 32 may be delivered without any pipe seal 10 arranged in the groove 36. The pipe seal 10 comprising a carrier member 12 being resiliently deformable can be easily inserted into the groove 36. The pipes 32, 42 are thus provided with a secure connection between each other that can be created and applied much faster than thrust blocks or external joint restraints. In particular, no external machines or tools are required for the process. Furthermore, as the pipe seals 10 are already configured for their particular application when they are applied, the task of applying the pipe seal 10 does not require any special skills for configuring the pipe seals 10. Therefore, it is possible to use pipe seals 10 adapted to a particular use scenario together with standardized pipes.

The pipe seal 10 according to the invention may be used in virtually any surroundings and, furthermore, is not prone to failure due to dirt or sand being present.

The carrier member 12 of the pipe seal 10 may be rigid if the pipe seal 10 is inserted into the first pipe 32 by a belling process. In this process, the plastic pipe 32, which is cylindrical and has a constant diameter over its length, is heated at one end. That end is pushed over a mandrel that will locally widen the pipe 32. The mandrel also carries the carrier member 12 and the sealing member 14 which protrude from its surface. Once the pipe 32 has been pushed over the mandrel, the end of the pipe 32 is cooled so that it becomes rigid again. When the mandrel is then withdrawn from the pipe 32, the pipe seal 10 will remain fixated in the groove 36 that was formed when the heated end of the pipe 32 was pushed over the mandrel.

Both embodiments of the invention—flexible carrier member 12 as well as rigid carrier member 12—work the same way. While the second pipe 42 is being inserted in the direction of insertion 44, the retaining insert 24 is disposed in a first position. The inward teeth 28 of the retaining insert 24 are inclined in the direction of insertion 44. The inward teeth 28 thus only barely make contact with an outer surface 46 of the second pipe 42 during this movement of the second pipe 42. Due to their inclination, the teeth 28 do not grip the surface 46 but rather slide on it. This way, the inward teeth 28 do not retain the second pipe 42 but rather let it pass into the first pipe 32.

During insertion of the second pipe 42, the outward teeth 29 usually do not make contact with the inner surface 34 of the first pipe 32. However, they may do so in closely spaced grooves 36 and contacting the inner surface 34 does not keep the retaining inserts 24 from functioning correctly.

When the second pipe 42 has been pushed in beyond the pipe seal 10, the second pipe 42 is then withdrawn slightly against the direction of insertion 44.

When the second pipe 42 is withdrawn, the inclined inward teeth 28 of the retaining insert 24 catch on the surface 46 and pierce the surface 46. The inward teeth 28 are thus closely anchored in the surface 26 and securely hold the second pipe 42 by its surface 46. In the same way, the outward teeth 29 will pierce the inner surface 34 of the first pipe 32 and anchor the pipe seal 10 between the pipes 32, 42. Due to this two-sided mechanical latching, the retaining inserts 24 effectively lock the pipes 32, 42 in place.

The pipe seal 10 with its retaining inserts 24 and their teeth 28, 29 will thus oppose forces that act on the pipes 32, 42 in directions that would draw the pipes away from each other. Accordingly, the pipes 32, 42 are secured against thrust and other axial forces.

Furthermore, the retaining insert 24 has a slide surface 48 that fits a slide surface 50 on the carrier member 12 (FIG. 2). The slide surfaces 48, 50 are curved so that the retaining insert 24 will pivot when it is slid along the surfaces 48, 50. When the second pipe 42 is inserted into the first pipe 32 equipped with the pipe seal 10, the combined sliding and pivoting movement will move the retaining insert 24 into a first position and allow the teeth 28 to be at least partially withdrawn into the opening 26. When the second pipe 42 is withdrawn, the retaining insert 24 pivots into a second position, in which the teeth 28 will protrude from the opening 26 and pierce the surface 46 with additional force. Furthermore, in the second position, the outward teeth 29 will be pivoted such that they are driven into the surface 34 of the first pipe 32.

The forces exerted by the pipe seal 10 on the groove 36 of the first pipe 32 are determined by two factors. Firstly, there are the above-mentioned thrust forces that are generally applied against the direction of insertion 44. These forces are transmitted to the groove 36 by the sealing member 14.

Secondly, there is pressure on the pipe seal 10 exerted radially by the first pipe 32 and the second pipe 42. This radial pressure squeezes the sealing member 14 and is used to further press the teeth 28 of the retaining insert 24 into the surface 46 of the second pipe 42.

The exterior surfaces 16, 18 of the carrier member 12 and the sealing member 14 are formed so that they conform to the groove 36. This way, forces that are exerted radially are distributed over a large contact surface between the carrier member 12, the sealing member 14 and the groove 36.

The above described embodiments of the invention show that the retaining insert 24 has teeth 28, 29 that are parallel to each other and that are inclined with respect to a surface of the retaining insert 24. However, other serration means could be used. The teeth 28, 29 do not necessarily have to extend over the entire length of the retaining insert 24. Along the length of the retaining insert 24, there may be multiple teeth 28, 29 that are arranged in a staggered formation. Furthermore, the retaining insert 24 might have spikes or prismatic protrusions instead of teeth 28, 29. Almost any kind of serration means or jagged surface will be usable that has the effect of increasing the forces transmissible between the retaining insert 24, the first pipe 32 and the second pipe 42. Accordingly, providing a rough surface with non-oriented micro serrations or jags may be sufficient to produce the desired effect.

Mostly, the retaining inserts 24 will be made of metal. However, any material with sufficient hardness will be usable. It is preferred for the material of the retaining insert 24 to have a higher hardness than the material of the first pipe 32 and/or that of the second pipe 42. That way, it is easier for the serration means or teeth 28, 29 to pierce the surfaces 34, 46 of the pipes 32, 42. The retaining inserts 24 should be made of a corrosion resistant material to improve the lifespan of the pipe seal 10. Preferred materials for the retaining insert 24 are aluminum and stainless steel, although plastic may be sufficient in certain situations.

Although the carrier member 12 is shown to be made of plastic in the embodiments, it is possible to use other materials as long as they provide sufficient support to the pipe seal 10. In particular, thermosets, thermoplastics, composite materials, metals as well as combinations thereof may be used in the carrier member 12.

In the embodiments shown above, the sealing member 14 is made of rubber. However, the sealing member 14 may be made of any material able to provide a sealing connection with the pipes 32, 42. In general, elastomeric materials are particularly suitable for use in the sealing member 14.

Depending on the application of the pipe seal 10, it is possible to provide retaining inserts 24 that are not of equal size and that are not distributed equally along the circumference of the carrier member 12. Depending on what kind of forces are expected to be exerted on the pipe seal 10, it may be necessary to provide larger retaining inserts 24 in certain regions of the pipe seal 10. Depending on the size of the pipe seal 10, it will usually comprise between 4 to 12 retaining inserts 24. However, the pipe seal 10 may comprise less than 4 or more than 12 retaining inserts 24.

While it may be possible to affix the retaining inserts 24 on the sealing member 14, the carrier member 12 stabilizes the pipe seal 10 and provides a much stronger support for the retaining inserts 24 than the sealing member 14. If the retaining inserts 24 are to be affixed to the sealing member 14, it would be advisable to provide some kind of stabilizing means in the sealing member 14.

The retaining inserts 24 are shown to be clamped by the opening 26 in the embodiments described above. However, it would also be possible to use snap-in-fitting, guidance grooves or other types of articulation to securely hold the retaining inserts 24. Furthermore, any type of articulation that both keeps the retaining inserts 24 in the openings 26 and allows for the sliding and/or pivoting movement mentioned above would be usable.

The retaining inserts 24 are arranged movably and pivotally in the openings 26 of the carrier member 12.

In all embodiments, the retaining inserts 24 are movable and/or rotatable and/or pivotal in the insertion direction 44 such that they permit the second pipe 42 to be inserted into the first pipe 32. Furthermore, the retaining inserts 24 will pivot to grip the second pipe 42 by means of the inward teeth 28, pivot to grip the first pipe 32 by means of the outward teeth 29 and securely hold and seal the joint between the pipes when the second pipe 42 is retracted and/or axial forces are working on the joint.

Although not shown in the embodiments described above, it is also possible to use the pipe seal 10 according to the present invention in fittings or couplers for connecting pipes. Such fittings are used to connect pipes that do not have a bell end and a spigot end, e.g. straight pipes with uniform diameter. The fitting constitutes a cylindrical section having a slightly larger diameter than the pipes that are to be connected. The pipe seal 10 or possibly several pipe seals 10 will be disposed on the inside of the fitting. The fitting will then be ready to receive pipes 32, 42 on both ends and will securely connect those pipes 32, 42 to each other.

The pipe seal 10 according to the invention provides a sealing connection for pipes which secures the connected pipes 32, 42 against thrust or other axial forces. The retaining inserts 24 provided in the carrier member 12 of the pipe seal 10 provide a retaining force by means of teeth 28, 29 thus effecting a secure connection of the pipes 32, 42.

LIST OF REFERENCES 10 pipe seal
12 carrier member
14 sealing member
16 exterior surface (carrier member)
18 exterior surface (sealing member)
22 interior surface (sealing member)
24 retaining insert
26 opening
28 inward tooth (serration means)
29 outward tooth (serration means)
30 first leg portion
32 first pipe
34 surface
36 groove
38 ridge
40 second leg portion
42 second pipe
44 direction of insertion
46 outer surface
48 slide surface
50 slide surface
52 inner grip portion
54 outer grip portion
56 attachment portion

What is claimed is:

1. Pipe seal for sealing a bell-and-spigot joint between a first pipe and a second pipe, said pipe seal comprising:
a carrier member and a sealing member attached to the carrier member, the carrier member having an unbroken annular shape, wherein the carrier member comprises a plurality of retaining inserts rotatably or pivotally mounted on the carrier member, wherein each of the retaining inserts comprises an inner grip portion for gripping the second pipe and wherein the retaining insert comprises an outer grip portion for gripping the first pipe.

2. Pipe seal according to claim 1, wherein the retaining insert comprises a curved surface which matches a curved surface of the carrier member to allow a guided pivoting or rotating movement of the retaining insert.

3. Pipe seal according to claim 1, wherein the inner grip portion comprises inner serration means.

4. Pipe seal according to claim 1, wherein the outer grip portion comprises outer serration means.

5. Pipe seal according to claim 1, wherein the retaining inserts are spaced evenly.

6. Pipe seal according to claim 1, wherein the retaining insert comprises an attachment portion for attachment to the carrier member.

7. Pipe seal according to claim 6, wherein the carrier member comprises an opening in which the retaining insert is mountable, and wherein the opening is slightly smaller than the attachment portion of the retaining insert in at least one dimension.

8. Pipe seal according to claim 7, wherein the opening affords sufficient space to allow rotation of the retaining insert.

9. Pipe seal according to claim 1, wherein the hardness of the retaining insert is higher than the hardness of the first pipe and higher than the hardness of the second pipe.

10. Pipe seal according to claim 1, wherein the retaining insert is made of metal.

11. Pipe seal according to claim 1, wherein the carrier member is resiliently deformable.

12. Pipe seal according to claim 1, wherein the carrier member is formed to conform to a surface of the groove such as to maximize a size of a contact portion between the carrier member and the groove.

* * * * *